(12) United States Patent
Rueb

(10) Patent No.: US 11,010,574 B2
(45) Date of Patent: May 18, 2021

(54) LONG RANGE BARCODE SCANNING THROUGH CONVERSION OF COHERENT LIGHT

(71) Applicant: Virtek Vision International ULC, Waterloo (CA)

(72) Inventor: Kurt D. Rueb, Kitchener (CA)

(73) Assignee: VIRTEK VISION INTERNATIONAL ULC, Waterloo (CA)

( * ) Notice: Subject to any disclaimer, the term of this patent is extended or adjusted under 35 U.S.C. 154(b) by 0 days.

(21) Appl. No.: 16/536,771

(22) Filed: Aug. 9, 2019

(65) Prior Publication Data
US 2020/0050812 A1   Feb. 13, 2020

Related U.S. Application Data

(60) Provisional application No. 62/717,431, filed on Aug. 10, 2018.

(51) Int. Cl.
*G06K 7/12* (2006.01)
*G06K 7/10* (2006.01)

(52) U.S. Cl.
CPC ............ *G06K 7/12* (2013.01); *G06K 7/10831* (2013.01); *G06K 7/10861* (2013.01); *G06K 7/1092* (2013.01)

(58) Field of Classification Search
CPC ... G06K 7/12; G06K 7/10861; G06K 7/10831
See application file for complete search history.

(56) References Cited

U.S. PATENT DOCUMENTS

| | | | | | |
|---|---|---|---|---|---|
| 4,983,817 | A | * | 1/1991 | Dolash | B07C 3/14 235/455 |
| 6,006,991 | A | * | 12/1999 | Faklis | G06K 7/12 235/462.06 |
| 2005/0035205 | A1 | * | 2/2005 | Li | G06K 7/10831 235/462.21 |
| 2009/0323058 | A1 | * | 12/2009 | Dyba | G02B 21/0076 356/301 |
| 2011/0114729 | A1 | * | 5/2011 | Moon | G06K 19/06178 235/454 |
| 2012/0318860 | A1 | * | 12/2012 | Anderson | G06K 7/12 235/375 |
| 2016/0084769 | A1 | * | 3/2016 | Chang | G01N 33/02 436/98 |
| 2018/0270474 | A1 | * | 9/2018 | Liu | A61B 6/508 |

* cited by examiner

*Primary Examiner* — Christle I Marshall
(74) *Attorney, Agent, or Firm* — Gregory D. DeGrazia; Miller, Canfield, Paddock and Stone PLC

(57) ABSTRACT

A method of optically scanning indicia on an object includes providing a coherent light source for illuminating the object with coherent light. The object is marked with indicia including a first feature and a second feature, with the first feature including reflection of coherent light and said second feature including emittance of non-coherent light when illuminated. An imaging device is capable of distinguishing coherent light from non-coherent light. The indicia are illuminated with coherent light generated by the coherent light source causing the indicia to reflect coherent light and emit non-coherent light. The coherent light is distinguished from the non-coherent light emitted from the indicia by a controller for identifying a pattern of one of said first feature and said second feature.

17 Claims, 5 Drawing Sheets

LONG RANGE BARCODE SCANNING THROUGH CONVERSION OF COHERENT LIGHT

PRIOR APPLICATIONS

The present application claims priority to U.S. Provisional Patent Application No. 62/717,431 file on Aug. 10, 2018, the contents of which are incorporated herein by reference.

TECHNICAL FIELD

The present invention relates generally toward an improved method for scanning barcodes or other patterns. More specifically, relates toward a method of distinguishing or blocking coherent light reflection from non-coherent emission of the barcode and other patterns that are illuminated by a coherent light source enabling the scanning of the barcode and other patterns at increased offset distances.

BACKGROUND

The use of indicia (coded markings) in the form of barcodes and QR markers have increased rapidly in manufacturing environments in recent years where indicia were previously primarily used in consumer markets. Indicia in this form have been used to identify products or objects to assist merchants in managing inventory and identifying the products at a point of purchase. In order to obtain an accurate scan of the barcode, and more recently QR marker that are usually affixed to a label, the label must be placed in close proximity to a barcode scanner. If the close proximity between the indicia and scanner is not achieved, the scanning process has proven unreliable.

More recently, the use of indicia in manufacturing has proven useful for quality control and to manage inventory in a factory or manufacturing setting. Assuring the proper part has been assembled to workpiece and signaling a controller a part has been removed from inventory has proven beneficial. However, the added step of scanning indicia due to proximity requirements has proven inefficient. In some instances a handheld scanner capable of wireless transmissions has been used. However, these handheld scanners are cumbersome and still require closes proximity to the indicia to work effectively. Alternatively, a stationary scanner is used that requires an operator to move the indicia into close proximity to the scanner, Which adds a step to the assembly process and reduces efficiency.

Attempts to reduce the inefficiency of using a close proximity scanner has, to date, proven futile. Long range scanning of indicia has proven futile as a method of eliminating the use of handheld scanners or close proximity scanning stations. Long range scanning would be particularly useful as quality control verification in the construction of composite assemblies where hundreds or even thousands of individual pieces of ply are layered over a mandrel. These pieces are often indistinguishable by appearance alone. Presently, attempts to use indicia to identify each piece by interpreting indicia disposed upon backing paper haven proven a hindrance to manufacturing efficiency due to the necessity of close proximity scanning. After a piece has been identified, further efficiencies can be achieved when a location for placement of the piece on the mandrel can be indicated by a laser projecting an outline using a laser projector of the type and process disclosed in U.S. Pat. No. 9,200,899 LASER PROJECTOR SYSTEM AND METHOD, the contents of which are incorporated herein by reference.

Proper confirmation of which piece has been selected by an operator is critical for meeting quality standards, particularly in aerospace applications. Improper part identification or placement can result in catastrophic failure of an aerospace component. Close proximity indicia scanning can be utilized during manufacturing small components, such as, for example turbine blades. However, larger components, such as, for example engine cowling or wings require transporting individual pieces to and from a close proximity scanner causing unreasonable process delays. A similar situation is known of moving assembly lines in automotive assembly and related factories where indicia are used to verify part selection.

Ambient light causes additional qualitative anomalies when attempting to scan indicia in manufacturing environments, not limited to, but particularly long range scanning. A common method of scanning indicia for the purpose of identifying a product or part is by way of a flying laser spot. In this example, a laser scans indicia and return intensity is recorded while scanning. A laser is useful in close proximity scanning because a beam of light from the laser projector can be focused on a very fine focus. The fine focus can be useful in overcoming high intensity of ambient light.

However, a laser beam has an inherent disadvantage in that laser speckle that is typical of any laser beam disrupts the ability to discriminate the contrast of returned light. This is best represented in FIG. 1 where the laser speckle generates a blurred response that is inherently inaccurate for high precisions scanning, which is required of long range barcode interpretation. This problem is only compounded when attempting long range scanning. Even integrating high precision cameras cannot overcome the problems associated with laser speckle. Therefore, it would be desirable to develop a process for scanning indicia at long ranges to identify parts without required additional steps and handling to assure an accurate scan.

SUMMARY

A method of optically scanning indicia on an object includes providing a coherent light source for illuminating the object with coherent light. The object is marked with indicia including a first feature and a second feature. The first feature includes reflection of coherent light and the second feature includes emittance of non-coherent light. An imaging device capable of distinguishing coherent light from non-coherent light is provided. The indicia are illuminated with coherent light generated by the coherent light source causing the indicia to reflect coherent light and emit non-coherent light. The coherent light is distinguished from the non-coherent light emitted from the indicia identifying a pattern of one of said first feature and said second feature.

MOM The bar code or QR marker making up the indicia, in one embodiment includes two different colors, one emits light in the fluorescent spectrum when illuminated and the other reflects light in the non-fluorescent spectrum. A camera or other imaging device is capable of resolving the difference between the coherent feature and the non-coherent feature to signal a controller a finely resolved pattern defined by the indicia. The contrast that is detected between the coherent light reflection and non-coherent emissions overcomes the problem associated with laser speckle, even at long distances.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

A method of the present invention provides an operator the ability to scan barcodes, QR marker and the like at distances significantly further than distances presently required of short range barcode scanners. Generating coherent light illumination then converting coherent incident light to non-coherent light overcomes problems associated with, for example, laser speckle that has heretofore required a scanner be in close proximity to a barcode, QR marker and the like.

Figures 2, 3:
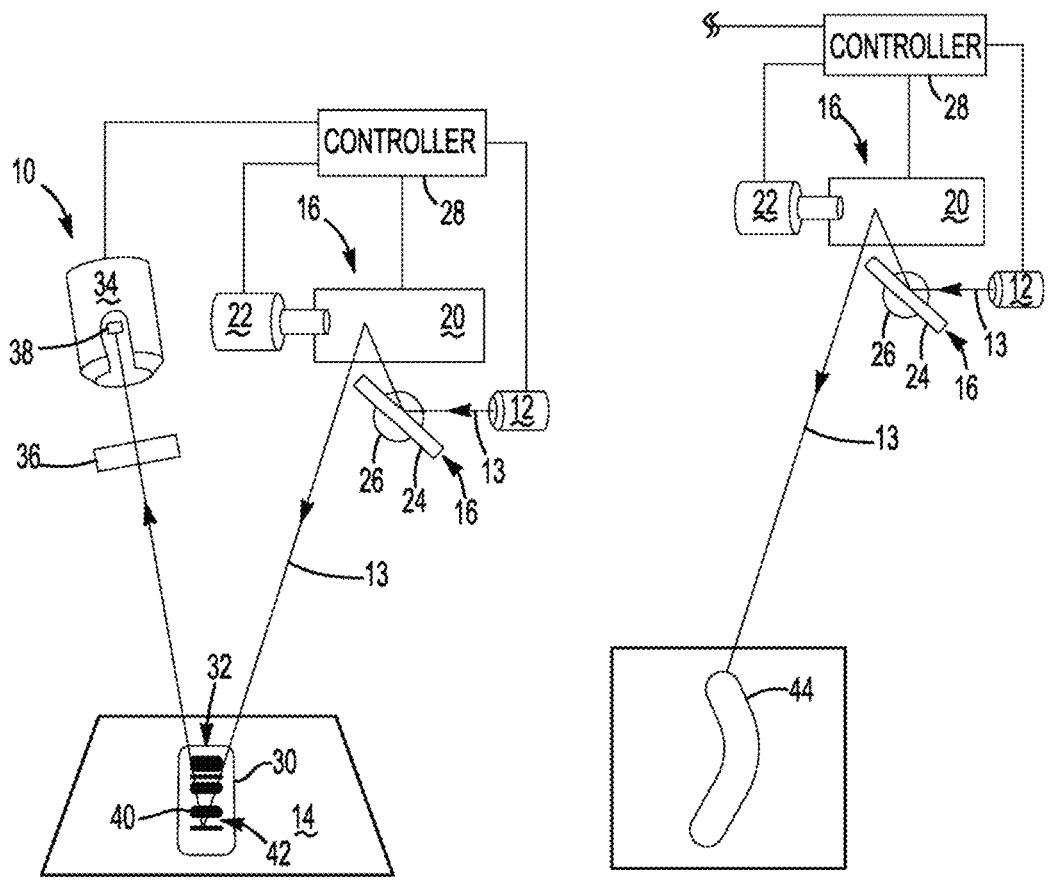
FIG. 2 shows a first embodiment of an indicia scanner of the present invention.
FIG. 3 shows a laser projector used to identify indicia projecting a laser template onto a work surface.

Referring now to FIG. 2, an assembly for practicing the method of the present invention is generally shown at 10. The assembly includes a laser projector 12 for generating a laser beam 13. The laser beam 13 is directed toward a work surface 14 by a first galvanometer 16 and a second galvanometer 18. The first galvanometer 16 includes a first reflective element 20 that is driven by a first scanning motor 22 and the second galvanometer 18 includes a second reflective element 24 includes a second scanning motor 26. A controller 28 also directs the first scanning motor 22 and the second scanning motor 26 to redirect the laser beam 13 to scan the work surface 14. More particularly, the controller 28 directs the first scanning motor 22 and the second scanning motor 26 to scan a piece of ply 30 that has been marked in with indicia 32.

An imaging device 34 images the work surface 14 and the piece of ply 30, and more particularly the indicia 32. The imaging device 34 is a camera, photogrammetry assembly, a light sensor array, or equivalent sensor capable of detecting light in the desired spectrum. In one embodiment, a coherent light filter 36 filters coherent light from reaching a light sensor element 38 of the camera 34.

The indicia 32 include a first feature 40 and a second feature 42 that is distinguishable from the first feature 40. The first feature 40 and the second feature 42 together form a barcode, QR marker, or an equivalent. The indicia 32 are unique to each piece of ply 30 so that the controller 28 can identify the piece of play 30 from a database. In one embodiment, the bars of a barcode form the first feature 40 and the background of the barcode forms the second feature 42. Alternatively, the background forms the first feature 40 and the bars barcode forms the second feature 42.

The laser projector 12 provides a source of coherent light, and, as such is merely exemplary. Alternative sources of coherent light are within the scope of this invention, including, but not limited to light emitting diodes and the like. The first feature 40 includes fluorescent die that emits, upon excitation, light in the fluorescent spectrum, and more particularly, in the orange spectrum, with a peak around 608 nm. However, fluorescent die capable emitting fluorescent light having different fluorescent spectrums upon excitation in different fluorescent peaks is also within the scope of the invention. It should be understood that either the first feature 40 or the second feature 42 may provide fluorescent emittance when illuminated. However, only one of the first feature 40 and the second feature 42 may provide fluorescent properties, the purpose of which will become more evident herein below.

Figure 1:
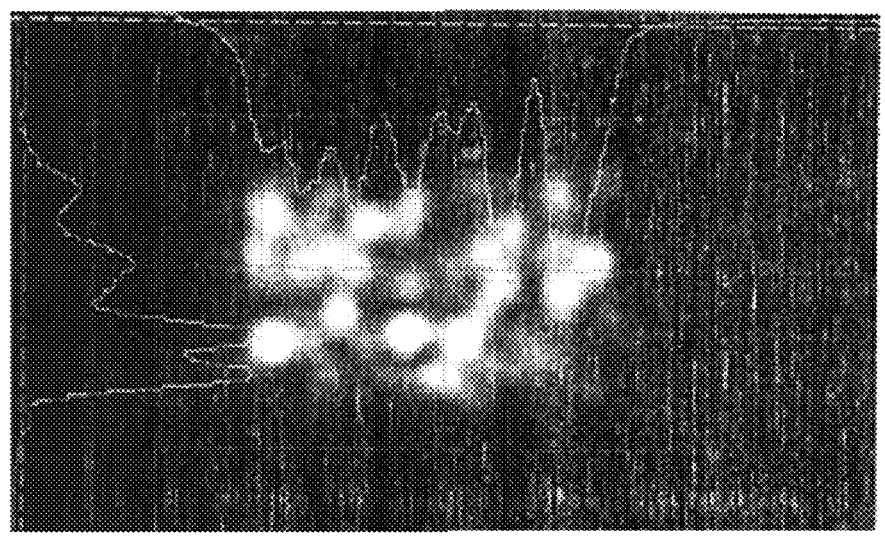
FIG. 1 shows an image of laser speckle known to disrupt long distance laser scans and blur long range laser images.
Figure 6:
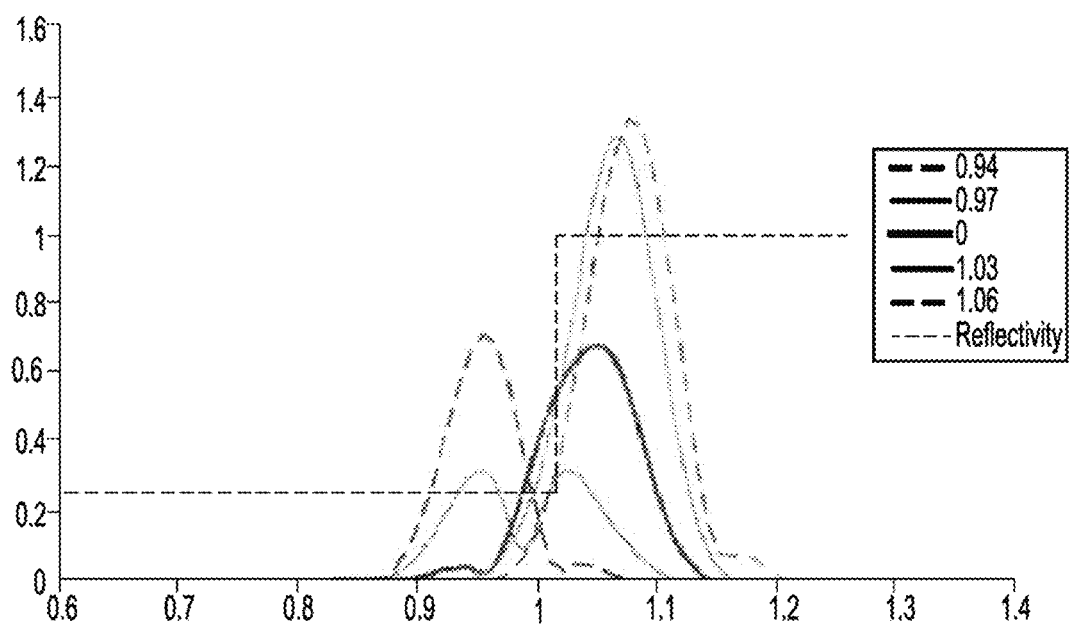
FIG. 6 shows a relative wavelength graph indicating obscured long distance scanning of indicia using a coherent light source.

FIG. 6 shows a plot of reflected coherent light generated by the source of coherent light 12, in this example a laser, scanned across a surface having contrasting reflectivity. Interference of the coherent light generated by the laser 12 obscures location of transition for high contrast edges and preventing detection of low contrast features, known to occur in barcodes, QR markers and the like. The inability to accurately detect a location of transition is exacerbated by the laser speckle shown in FIG. 1 that becomes more blurred at long distances. When the area to be covered by the laser beam 13 is large and the indicia 32 are limited, the ability to accurately distinguish, for example, the first feature 40 from the second feature 42 becomes wholly inadequate. Thus, indicia 32 place upon a small part that is placed on a large tool or where a manufacturing function that covers broad spaced requires an extra processing step to move the indicia into close proximity to a scanner, precisely the problem solved by the invention of the present application.

Figure 4:
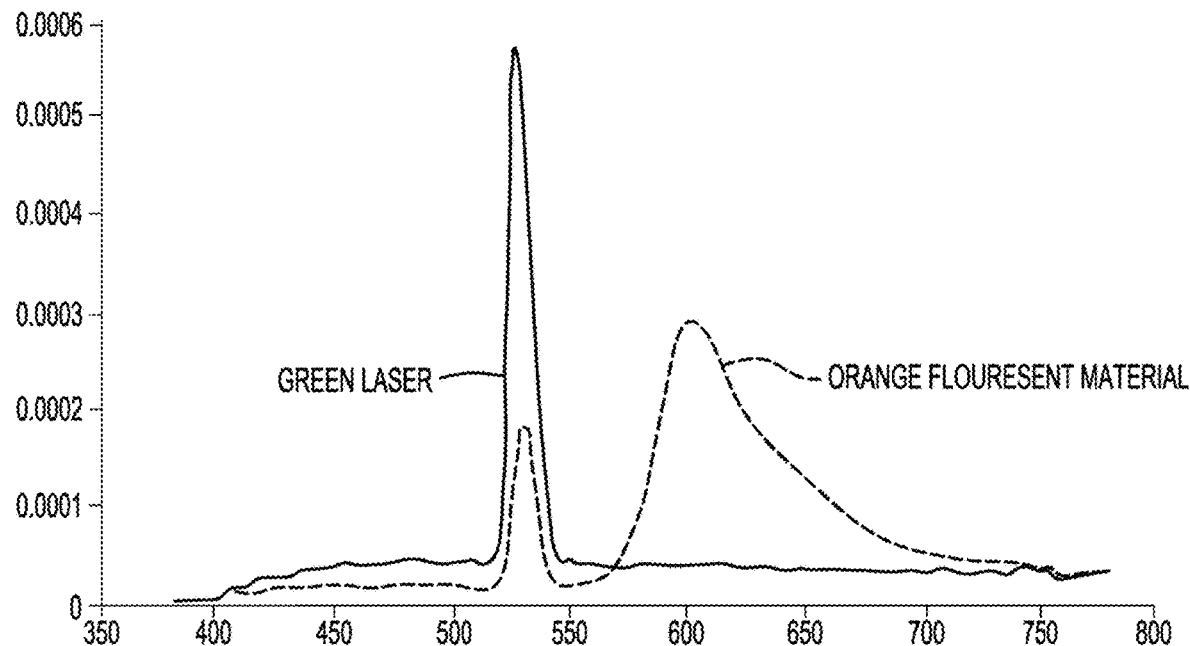
FIG. 4 shows a wavelength graph indicating emittance of fluorescent material using green laser excitation.
Figure 5:
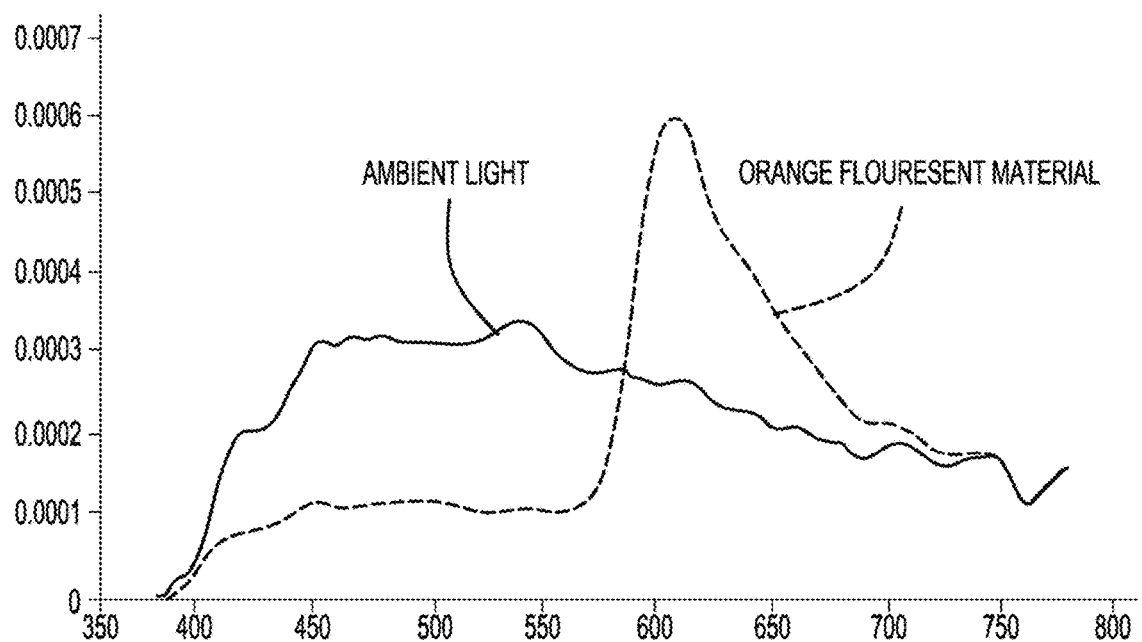
FIG. 5 shows a wavelength graph distinguishing non-coherent light emission with fluorescent die in ambient lighting.

FIG. 4 shows excitation of a fluorescent material by a green laser that transmits coherent light at a peak of about 530 nm. In this example, the fluorescent material is generates an orange fluorescent response elimination that is non-coherent having a peak response at about 608 nm. Illumination of fluorescent material by a light source outside the fluorescent band provides an emission from the fluorescent material that is easily separable from the light sources. FIG. 5 shows, by way of non-limiting example, the illumination of the orange fluorescent material by an ambient light source, where the orange fluorescent material still generates an emission response peaking around 608 nm still providing for differentiation from reflected light from the green laser or LED that includes a peak wavelength of about 530 nm. This distinguishing non-coherent emission result is illustrative of ambient illumination typical of any manufacturing environment when a laser or LED source is used for illumination.

The emission from the fluorescent material is non-coherent light, even when illuminated by coherent light generated by a laser or LED source. When a pattern is provided having a first feature 40 that is fluorescent, for example in the orange spectrum, and the second feature 42 is non-fluorescent, the first feature 40 and the second feature 42 can be easily distinguished by the imaging device 34 as is apparent by the separation of the fluorescent emission shown in FIG. 4 from coherent light reflections generated by the green laser light. The sensor element 38 in the imaging device may be a CMOS, CCD or equivalent light sensor depending upon the application needs. Further accuracy is achievable by optically blocking the coherent excitation energy and/or ambient reflection by locating an optical filter 36 between the sensor element 38 and the work surface 14 and piece of ply 30. The filter 36 is selected to filter coherent light in the range of about 570 nm to about 670 nm so that the camera 34 detects primarily non-coherent light emitted by the fluorescent first feature 40 providing a high level of intensity at a line or separation defined between the first feature 40 and the second feature 42. In this manner, the controller 28 is signaled a high resolution pattern associated with the barcode or QR marker enabling the controller 28 to easily identify the piece of ply 30 onto which the indicia 32 is adhered, even at long ranges. It should be understood that the use of a green laser and orange fluorescent material is merely exemplary and coherent light generated in another wavelength and different fluorescent emissions are within the scope of this invention. Different emission and illumination light ranges may be useful in different manufacturing environments and are also within the scope of this invention. The ambient light, in one embodiment, can also be eliminated by identifying the background level reflection of the indicia 32 prior to illumination by the source of coherent light 22. Thus, the background light reflection can be subtracted from the image generated by the imaging device 34 after illumination of the indicia 32 by the source of coherent light 12

The filter 36, in one embodiment, is selected to block most ambient light in addition to coherent light generated by the source of coherent light 22. The filter 36 may take the form of a passive optical component useful in filtering light through it or a dichroic mirror that splits one or more of a range of wavelengths as will be explained further herein below with respect to an alternative embodiment. In a still further embodiment, the sensor element 38 may include two sensors with one being adapted to detect coherent light from the source of coherent light 22, a green laser, for example, and a second sensor being adapted to detect only non-coherent light emitted from the fluorescent material, orange fluorescent material, for example.

It is contemplated by the inventor that the camera 34 may have some difficulty initially locating the indicia 32 in a large work area prior to interpreting the indicia, such as, for example, in an aerospace work cell used to manufacturer composite wings. Thus, the controller 28 directs the source of coherent light 22 to scan the work surface 14 while synchronizing the imaging device 34 with the movement of the laser beam 12 over the work surface 14. The imaging device 34 senses when the laser beam 12 scans the fluorescent material causing and emission of non-coherent light. This high speed capture does not, at this time, provide sufficient resolution to interpret the indicia 32, but merely monitors the returned intensity as the laser beam 12 scans across the indicia 32. The controller 28 associates time of detection of the non-coherent light in target range with position of the laser scan to identify the location of the piece of ply 30, and therefore, the indicia 32. Once the indicia 32 are located, the controller 28 initiates the interpretation of the indicia 32 to identify the piece 30 of ply or part.

Alternatively, the imaging device 34 continuously monitors the work surface 14 until ambient light interacts with the indicia 32, and more specifically, the first feature 40 that is fluorescent. The controller 28 is signaled from the imaging device 34 a location of a non-coherent emission from the fluorescent material. Subsequently, the controller 28 signals the source of coherent light 22 where to scan the laser beam 12 for generating a high resolution image of the indicia 32 for the purpose of interpreting the indicia 32 and identifying the piece of ply 30. Therefore, after the controller 28 determines the location of the indicia 32, the imaged device 34 is synchronized with the scanned location of the laser beam 13 on the work surface 14.

Figure 7:
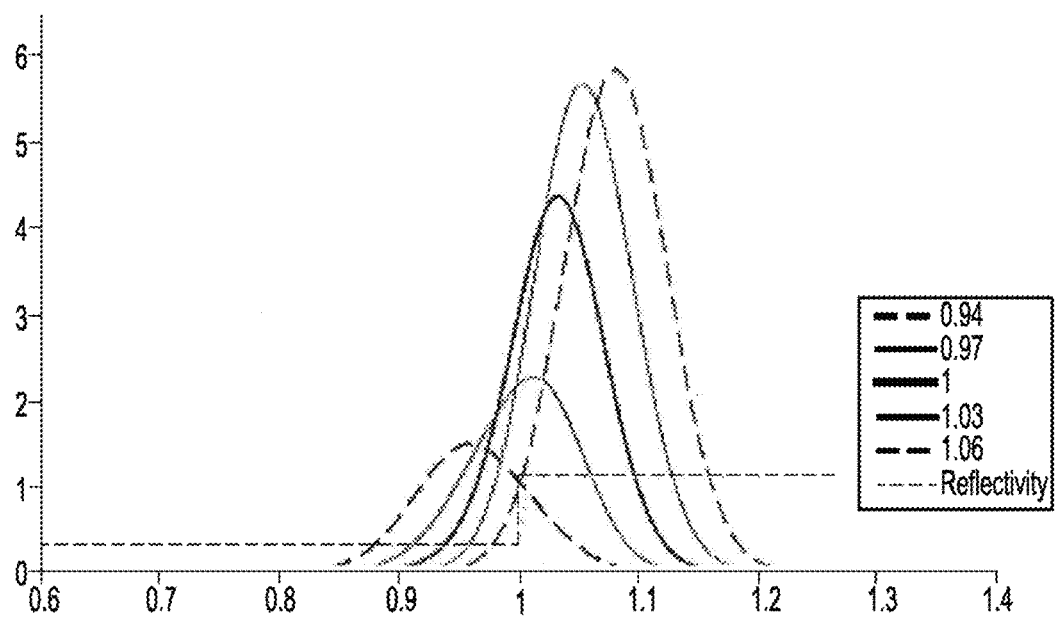
FIG. 7 shows a relative wavelength graph indicating the enhanced scanning of indicia using conversion of coherent light to non-coherent light.

FIG. 7 shows the enhancement the invention of the present application provides with respect to long range scanning of a barcode or other indicia where precise demarcation between adjacent features (bars and background) must be identified for accurate interpretation. As shown in the image in FIG. 1, laser speckle becomes blurred as a laser focus becomes more distant from the laser. FIG. 7 shows a graph of the coherent light being scanned over the indicia 32 to emit non-coherent light from the indicia 32 that scans a barcode, which includes fluorescent conversion of coherent light to non-coherent light. The scan with non-coherent light shows the intensity changes smoothly as the line plots cross the reflectivity step representing each edge of a bar contained in a given barcode. The plot represents an appearance of a camera even with limited resolution of a camera lens as the laser beam is scanned across the step change in reflectivity as defined by each bar of a barcode. Each of the line plots in FIG. 6 represents a step in the laser position. By relying on the predictable response, it can be inferred precisely where the reflective step occurs, and providing the ability to estimate a width of individual bar code lines even if an individual line is narrower than a resolution of both the laser and the lens. The dashed line indicating "Reflectivity" is representative an actual edge that requires detection for accurate interpretation of a barcode at 1 on the horizontal axis. The overlap in reflectivity at 1 of the horizontal axis results from the laser speckle variations in intensity resulting in interference of reflected coherent light as seen in FIG. 6. The result is the camera being unable to detect where the edge of the bar is actually located. However, as shown primarily in FIG. 7, converting coherent light, in this example generated by a green laser, to non-coherent light, provides for separation from of the coherent light from the non-coherent light at the edge of a given bar enabling a light sensor or camera to clearly identify an edge of a bar even at long distances.

In a still further embodiment, the imaging device 34 detects characteristic spectrum of indicia 32 that includes the first feature 40 and the second feature 42, where at least one of the features 40, 42 is fluorescent, approximating a location of each bar of a barcode. This facilitates, in rapid manner the imaging device 34 scanning high resolution images when using the coherent light 13 from the source of coherent light 22 to illuminate the indicia 32 based upon characteristic ambient light reflect or emitted from the indicia 32. Therefore, the laser projector (coherent light source 22) does not need to search for the indicia 32 when the imaging device 34 signals an approximate location of the indicia 32 to the controller 28 that in turn signals the laser projector where to scan the laser beam 12.

In a still further embodiment best shown in FIG. 3 (for continuity with FIG. 2), the laser project and system described in U.S. Pat. No. 9,200,899 LASER PROJECTOR AND METHOD serves as the coherent light source. Therefore, the same laser that scans the indicia 32 also scans a laser template 44 used to direct an operator where to place the piece of ply 30 or other part on the work surface 14. Thus, the controller 28 is signaled which piece of ply 30 has been selected based upon the scan of the indicia 32. The controller 22 then either directs an operator where to place the piece of ply 30 based upon the indicia 32 detected or signals an error indicating the piece of ply 30 has been selected out of proper assembly sequence. This sequence occurs merely by an operator placing the piece of ply within imaging range of the imaging device 34 so that the indicia 32 may be scanned after illumination with the coherent light.

Figure 8:
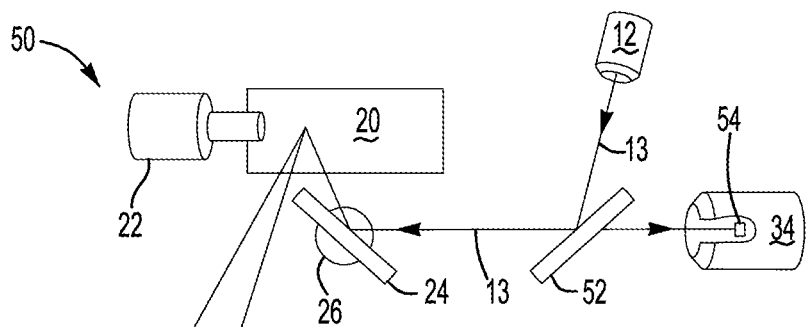
FIG. 8 shows an alternative embodiment of the indicia scanner of the present invention.
Figure 8:
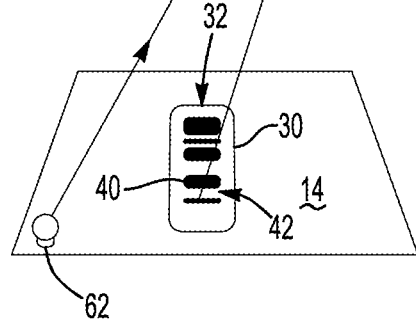

FIG. 8 shows a further alternative embodiment generally at 50 where like elements to the prior embodiment includes like element numbers. In this embodiment, fluorescent emissions from the indicia 32 are sensed by the imaging device 34 as returned along as same path as the laser beam 13.

The laser 12 (coherent light source) is a green laser transmitting a laser beam 13 having a peak of about 532 nm onto a dichroic mirror 52 to the first reflective element 20 and the second reflective element 24 to the location of the indicia 32 where either the first feature 40 or the second feature 42 including fluorescent materials. Returned light emitted from the fluorescent material is redirected by the first and second reflective elements 20, 24 to the dichroic mirror 52 that transmits only light that peaks at the fluorescent wavelength of about 608 nm to the sensor 54. The sensor 54, in this embodiment, includes collection optics and sensor electronics, such as, for example, photodiodes, photomultipliers, and equivalents to provide necessary detection sensitivity.

Figure 9:
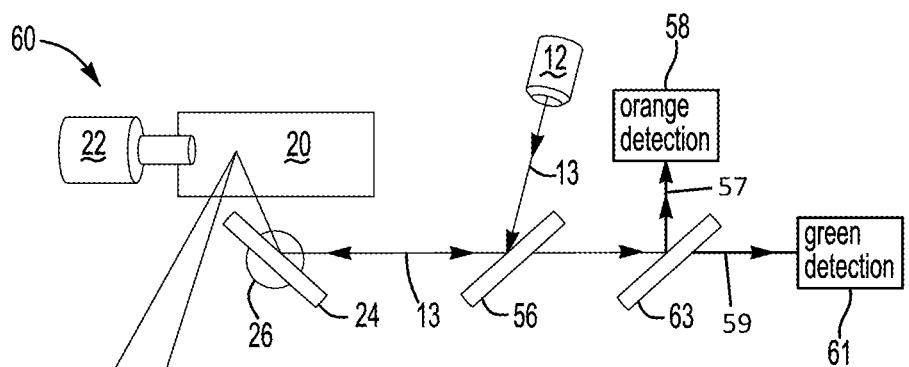
FIG. 9 shows a further alternative embodiment of the indicia scanner of the present invention.
Figure 9:
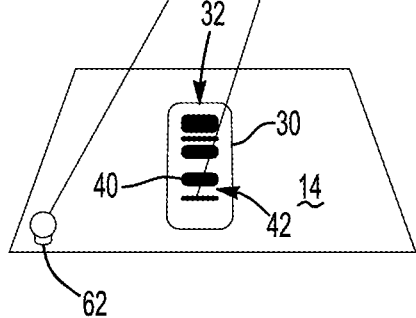

Alternatively, a still further embodiment is generally shown at 60 in FIG. 9 and includes a non-dichroic (partially reflective) mirror 56 added to the assembly for filtering and directing the fluorescent emission 57 to a non-coherent light sensor 58 and the coherent light 59 to a different and a coherent light sensor 61. This arrangement provides the added benefit of the detecting laser light reflect from retroreflective targets 62 disposed upon the work surface 14 for accurate location of the work surface 14 in a three-dimensional coordinate system relative to the laser projector 22. Therefore, the same laser projector 22 is used for scanning retroreflective targets 62, projecting the laser template 44 (FIG. 3) and for scanning the indicia 32 with coherent light. Once the indicia 32 has been scanned and interpreted, the laser projector scans the retroreflective targets 62 for locating the work surface 14 in a three-dimensional coordinate system. The retroreflective targets 62 return coherent light toward the source 12 in a known manner. This arrangement also provides for improved detection of fluorescent emissions by comparing the emissions to the level of coherent light reflected enabling the calculation of the ratio between the two wavelengths (532 nm vs. 608 nm). Therefore, both coherent and non-coherent wavelengths pass across the partially reflective mirror 56 to modified sensors 58, 61. The modified sensor 58, 61 are optionally enhanced by adding an internal dichroic mirror or splitter (not shown) to reflect light emissions into separate orange and green wavelengths.

Figure 10:
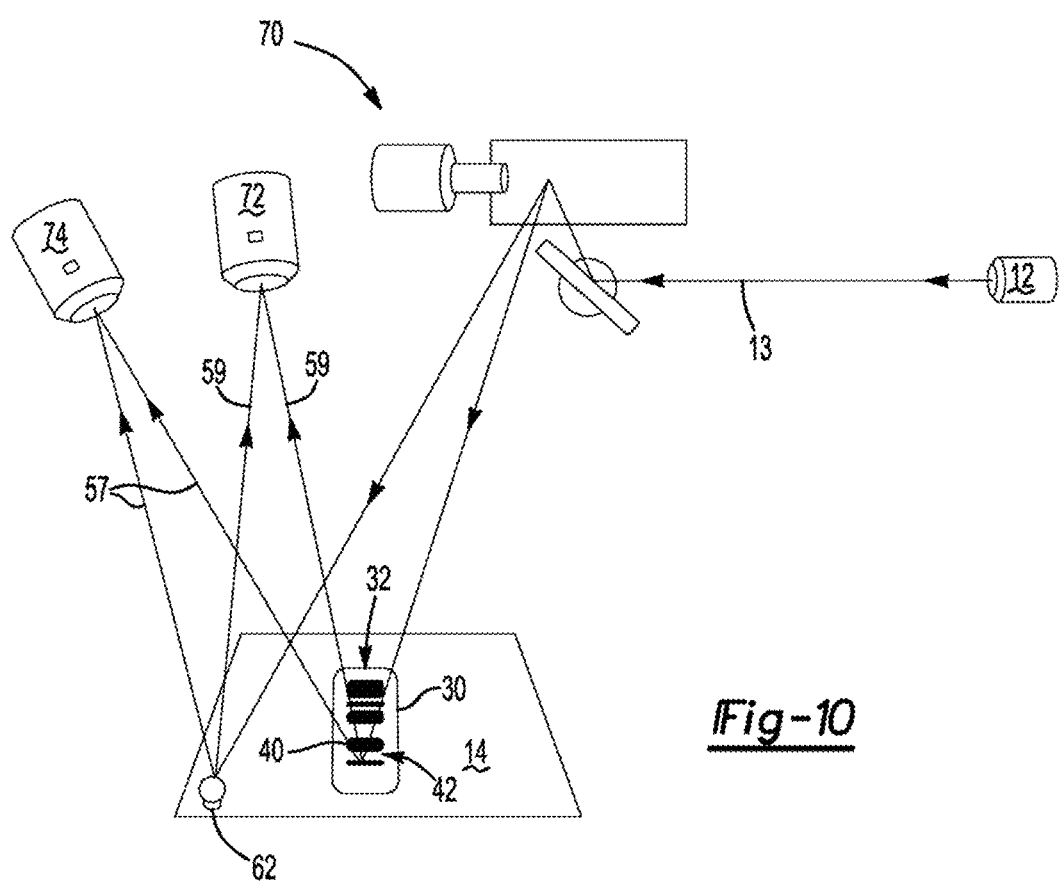
FIG. 10 shows a still further alternative embodiment of the indicia scanner of the present invention.

A still further embodiment is generally shown at 70 of FIG. 10 wherein like elements to the first embodiment include like element numbers. A first camera 72 and a second camera 74 received light emitted from the work surface 14 and the indicia 32, which includes a fluorescent first feature 40 as set forth above. The first camera 72 is green filtered and the second camera 74 is orange filtered. Of course, it should be understood that using a first camera 72 and second camera 74 in this manner is intended for use in detecting a reflected green laser beam and emitted orange fluorescent light. Alternatively, the first camera 72 is green filtered and the second camera 74 green/orange filtered so that the difference in wavelength is calculated to accurately detect the orange wavelength emitted from the first feature 40. Still further, filters may be alternated for detecting either green laser reflection or orange fluorescent emittance. This alternative arrangement enables the two cameras 72, 74 to triangulate the laser beam 12 when reflected from a retroreflective targets 62 affixed to the work surface 14 in a manner set forth in U.S. Pat. No. 9,200,899 LASER PROJECTOR SYSTEM AND METHOD for making photogrammetric measurements. Therefore, the laser projector 12 serves a dual function of locating the object and/or work surface 14 in three dimensions for projecting the laser template 44 (FIG. 3) or image and scanning the barcode or indicia 32 with coherent light to verify the proper piece or ply has been selected for placement as directed by the laser template.

The inventor of the present application has determined that synchronization of the emitted energy (light waves) with the motion of the scanned laser beam 12 permits rapid decoding of the indicia 32, and more specifically, the first feature 40 and the second feature 42, that is adhered to the piece of ply 30. In this manner, traditional laser projector systems used for projecting manufacturing templates can be purposed for providing barcode scanning functionality.

Obviously, many modifications and variations of the present invention are possible in light of the above teachings. The foregoing invention has been described in accordance with relevant legal standards; thus, the description is merely exemplary rather than limiting in nature. Variations and modifications to the disclosed embodiment have become apparent to those skilled in the art and do come within the scope of this invention. Accordingly, the scope of the legal protection afforded this invention can only be determined by studying the following claims.

What is claimed is:

1. A method of optically scanning indicia on an object, comprising the steps of:
   providing a coherent light source for illuminating the object with coherent light;
   marking the object with an indicia including a first feature and a second feature with said first feature including emittance of non-coherent light and absorption of coherent light and said second feature including reflectance of coherent light without emitting non-coherent light;
   providing an imaging device capable of distinguishing coherent light from non-coherent light;
   scanning a work area with the coherent light and synchronizing movement of the coherent light with the imaging device for locating the indicia in a workspace;
   illuminating the indicia with coherent light generated by the coherent light source thereby causing the indicia to reflect coherent light and emit non-coherent light; and
   detecting presence or absence of the non-coherent light emitted from the indicia thereby identifying a pattern of one of said first feature and said second feature.

2. The method set forth in claim 1, wherein said step of distinguishing coherent light from non-coherent light is further defined by filtering coherent light from said imaging device.

3. The method set forth in claim 1, wherein said step of marking the object with indicia including a first feature and a second feature is further defined by said first feature being fluorescent and said second feature being non-fluorescent.

4. The method set forth in claim 3, wherein said step of marking the object with indicia including a first feature and a second feature is further defined by said first feature emitting non-coherent light when illuminated by coherent light and said second feature reflecting coherent light when illuminated by coherent light.

5. The method set forth in claim 1, further including a step of said imaging device locating the indicia by detecting emittance of fluorescent light from said first feature.

6. The method set forth in claim 1, wherein said step of providing a coherent light source is further defined by providing a laser projector for projecting a beam of coherent light.

7. The method set forth in claim 1, wherein said step of illuminating the object with a coherent light source is further defined by scanning the indicia with a green laser beam having a wavelength of about 532 nm.

8. The method set forth in claim 1, further including a step of said first feature absorbing light having a wavelength of less than about 575 nm and emitting light having a peak wavelength of about 608 nm.

9. The method set forth in claim 1, further including a step of filtering coherent light having a wavelength below about 575 nm.

10. The method set forth in claim 1, wherein said step of distinguishing coherent light from non-coherent light is further defined by providing one of a dichroic mirror and a beam splitter for directing coherent light reflected from the first feature to a first light sensor and directing non-coherent light emitted from the second feature to a second light sensor.

11. The method set forth in claim 1, wherein said step of providing an imaging device is further defined by providing a camera including a coherent light sensor and a non-coherent light sensor.

12. The method set forth in claim 1, wherein said step of providing a coherent light source is further defined by providing a laser projector being capable of projecting a laser template onto a work surface defined by said indicia disposed upon the object.

13. The method set forth in claim 12, wherein said step of projecting a laser template onto work surface is further defined by interpretation of said indicia being indicative of where the laser template is projected onto the work surface.

14. The method set forth in claim 12, wherein said object is placed upon the work surface at a location indicated by said laser template.

15. The method set forth in claim 1, wherein said imaging device includes two cameras for triangulating a location of a target thereby determining a location of the target in a three dimensional coordinate system.

16. The method set forth in claim 15, further including a step of selectively filtering one of said first camera and said second camera for reflected coherent light and emitted non-coherent light.

17. The method set forth in claim 1, further including a step of said second feature absorbing coherent light.

\* \* \* \* \*